(12) United States Patent
Petroci et al.

(10) Patent No.: US 9,328,830 B2
(45) Date of Patent: May 3, 2016

(54) RESIDUAL PRESSURE VALVE

(71) Applicant: AVOX SYSTEMS, INC., Lancaster, NY (US)

(72) Inventors: Jan M. Petroci, Depew, NY (US); Duard C. Bennett, Kenmore, NY (US)

(73) Assignee: Avox Systems, Inc., Lancaster, NY (US)

( * ) Notice: Subject to any disclaimer, the term of this patent is extended or adjusted under 35 U.S.C. 154(b) by 248 days.

(21) Appl. No.: 13/865,264

(22) Filed: Apr. 18, 2013

(65) Prior Publication Data

US 2013/0276919 A1    Oct. 24, 2013

Related U.S. Application Data

(60) Provisional application No. 61/635,391, filed on Apr. 19, 2012.

(51) Int. Cl.
*F16K 21/04*    (2006.01)
*F16K 15/00*    (2006.01)
*F16K 1/30*    (2006.01)
*F16K 15/02*    (2006.01)

(52) U.S. Cl.
CPC ............... *F16K 15/00* (2013.01); *F16K 1/307* (2013.01); *F16K 15/025* (2013.01); *Y10T 137/7922* (2015.04)

(58) Field of Classification Search
CPC ....... F16K 15/00; F16K 15/025; F16K 1/307; Y10T 137/7922
USPC ............... 137/526, 528, 540, 543.13, 543.15; 220/89.1
See application file for complete search history.

(56) References Cited

U.S. PATENT DOCUMENTS 2,341,579 A * 2/1944 Sundstrom ......................... 222/3
3,580,275 A * 5/1971 Hanson et al. ............ 137/516.29

* cited by examiner

*Primary Examiner* — Kevin Lee
*Assistant Examiner* — P. Macade Nichols
(74) *Attorney, Agent, or Firm* — Kilpatrick Townsend & Stockton LLP; Dean W. Russell; Renae Bailey Wainwright (57) ABSTRACT

A residual pressure valve configured to maintain a residual pressure within a pressure vessel to prevent contaminants or gaseous diluents from entering the vessel after it has been discharged/depressurized. In some embodiments, the residual pressure valve is situated between the pressure vessel and an upper seat of the regulator assembly and moves between an open position and a closed position to seal the pressure vessel from the upper seat of the regulator assembly when the pressure within the pressure vessel drops below a residual pressure level.

24 Claims, 7 Drawing Sheets

RESIDUAL PRESSURE VALVE

CROSS-REFERENCE TO RELATED APPLICATIONS

This application claims the benefit of U.S. Provisional Application Ser. No. 61/635,391 filed Apr. 19, 2012 and titled "Residual Pressure Valve," the contents of which are incorporated herein by reference.

FIELD OF THE INVENTION

Embodiments of the invention generally relate to pressure valves.

BACKGROUND OF THE INVENTION

Pressure regulatory assemblies are used to control the distribution of gas or fluids from pressure vessels storing the gas or fluids at a pressure that is different from ambient pressure. Pressure vessels are used in a variety of applications and industries, including but not limited to the storage of breathing oxygen. If a pressure vessel is fully discharged and a fluid connection (such as a leak path) remains from outside the vessel to inside the vessel, outside gases, liquids, and/or particulate containments may be introduced inside the vessel, which dilutes the purity of gas or fluids within the vessel. As such, after being fully depressurized, the pressure vessel must be purged and/or cleaned, which is costly and time consuming.

SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

In certain embodiments there is provided a residual valve assembly that is configured to maintain a minimum residual pressure within a pressure vessel to prevent contaminants or gaseous diluents from entering the vessel after the vessel has been discharged/depressurized.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
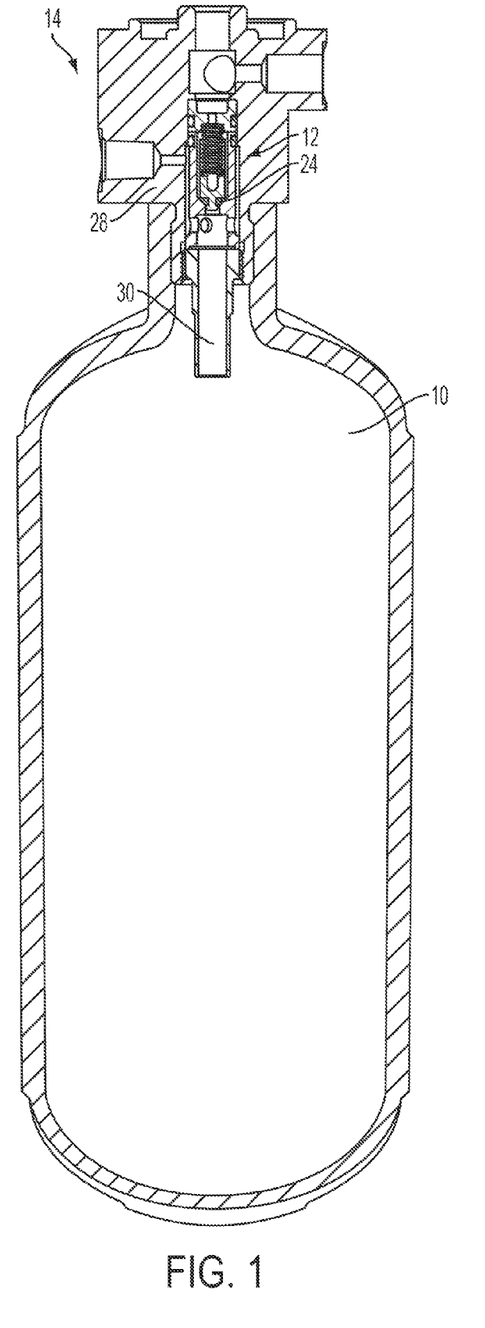
FIG. 1 is a side cross-sectional view of a portion of a regulator assembly according to one embodiment, shown assembled with a pressure vessel.

Disclosed herein are residual valves for use with pressure vessels and the like. As shown in FIG. 1, a residual valve assembly 12 is seated within a regulator assembly 14 connected to a pressure vessel such as, but not limited to, a pressure cylinder 10. In some embodiments, regulator assembly 14 is a conventional regulator assembly and the residual valve assembly 12 is positioned within what is otherwise unutilized space of the regulator assembly. As shown in FIG. 1, residual valve assembly 12 may be situated within a bore of a tube 30 of the regulator housing 28 so the residual valve assembly 12 is in communication with the tube 30 of the regulator housing 28. In some embodiments, the residual valve assembly 12 is threaded or connected in any suitable manner to the regulator housing 28.

Figure 4:
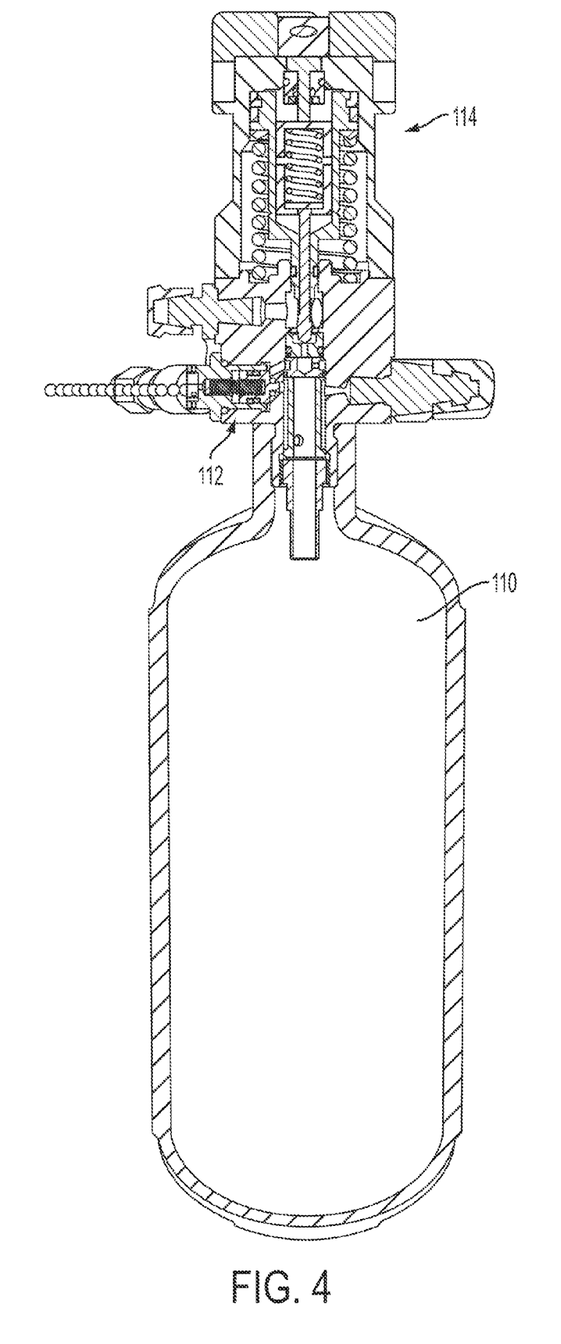
FIG. 4 is a side cross-sectional view of a portion of a regulator assembly according to another embodiment, shown assembled with a pressure vessel.

Tube 30 provides a connection path between the contents of the pressure vessel 10 and the regulator assembly 14. The regulator assembly 14 (a non-limiting embodiment of which is shown more fully in FIG. 4) regulates the release of the contents of the pressure vessel 10 to a user, into the atmosphere, or otherwise.

As shown in the Figures, residual valve assembly 12 is positioned between the pressure vessel 10 and a regulator seat 34 of the regulator assembly 14 so the residual valve assembly 12 is capable of regulating the release of the contents of the pressure vessel 10 to the regulator seat 34 of the regulator assembly 14. The residual valve assembly 12 has an open position and a closed position. When the residual valve assembly 12 is in the closed position (FIGS. 1-2), a poppet valve 16 or other suitable valve is situated within a seat 32 of the tube 30 such that it seals the tube 30 and prevents the contents of the pressure vessel from flowing from the pressure vessel 10 to the regulator seat 34 of the regulator assembly 14. Similarly, the seal formed between the poppet valve 16 and the seat 32 prevents elements from the atmosphere (such as gas, liquid, or contaminate particulates) from entering the pressure vessel 10. In some embodiments, an O-ring 24 or other suitable sealing mechanism extends around an end of the poppet valve 16 to further enhance the seal between the poppet valve 16 and the tube 30.

Figure 3:
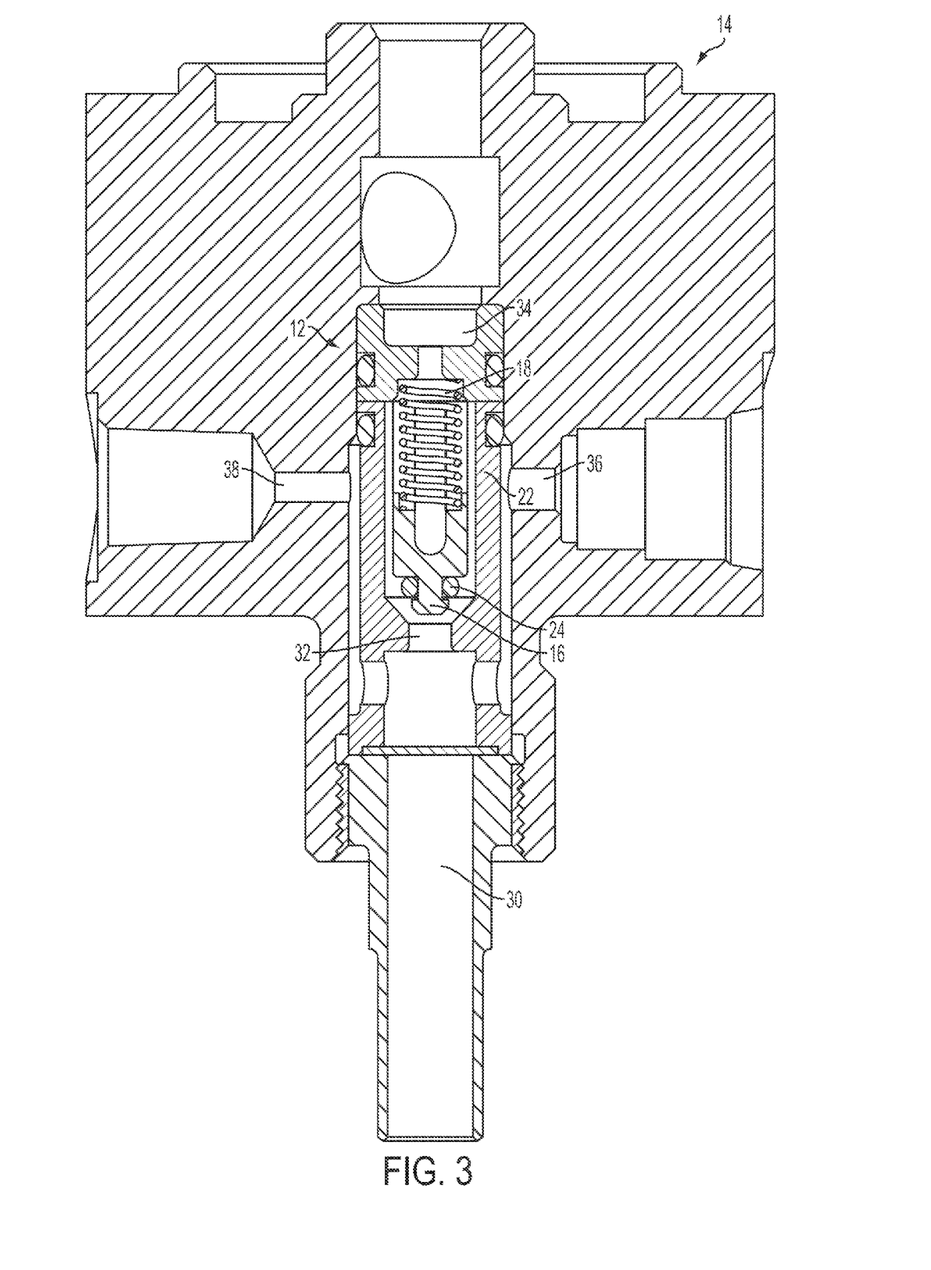
FIG. 3 is a side cross-sectional view of the portion of the regulator assembly of FIG. 2, shown with the residual pressure valve in the open position.

FIG. 3 illustrates the residual valve assembly 12 in the open position. Specifically, the poppet valve 16 has moved upward within the regulator housing 28 so it is no longer seated within the seat 32 of the tube 30. As such, the contents of the pressure vessel 10 can flow freely around the poppet valve 16 and through the valve body 22 of the residual valve assembly 12 and out of the regulator seat 34 of the regulator assembly 14.

Figure 2:
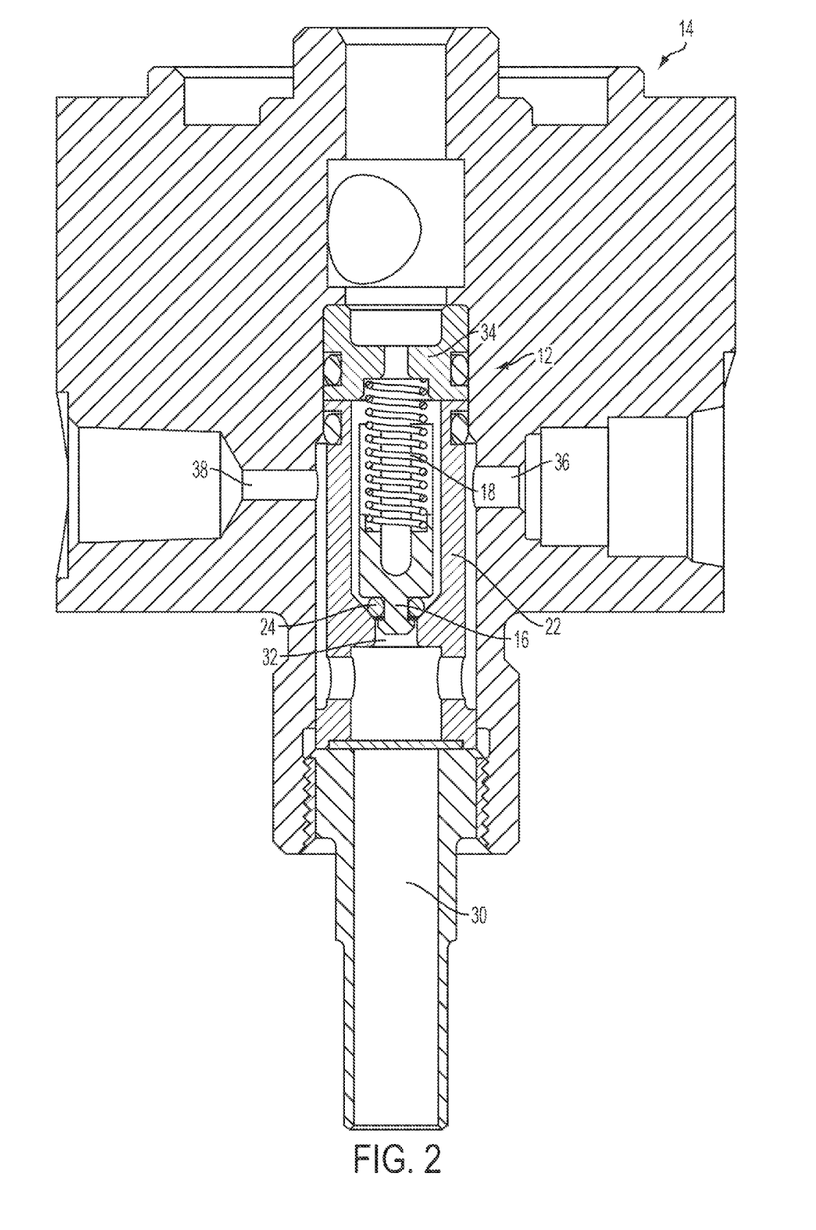
FIG. 2 is a side cross-sectional view of a portion of the regulator assembly of FIG. 1, shown with the residual pressure valve in the closed position.

In the embodiment illustrated in FIGS. 1-3, a spring 18 acts upon the poppet valve 16 to move it relative to the seat 32 of the tube 30. For ease of reference, the pressure acting on the poppet valve 16 from the contents of the pressure vessel 10 is referred to as the cylinder pressure, and the pressure acting on the other end of the poppet valve 16 from the regulator seat 34 is referred to as the regulator pressure. When the spring 18 is in a compressed state, the residual valve assembly 12 is in the open position (FIG. 3) and when the spring 18 is in an uncompressed state, the residual valve assembly 12 is in the closed position (FIG. 2).

In some embodiments, the spring 18 is configured so that, when the cylinder pressure drops below a predetermined value, the spring 18 is released into its uncompressed state, which forces the poppet valve 16 into the seat 32 of the tube 30 so the residual valve assembly is in the closed position (FIG. 2). This predetermined value is sometimes referred to as the residual level. In some embodiments, the residual level ranges from approximately 25 Pounds per Square Inch Gauge (PSIG) to approximately 70 PSIG, although other levels may be used in various applications. In some embodiments, the spring 18 is selected so its tensile force is generally less than the cylinder pressure until the cylinder pressure reaches (or drops below) the residual level. In other words, the tensile force of the spring may be generally proportional to the residual level.

Moreover, in some embodiments, the residual valve assembly 12 is configured such that, when there is no differential pressure across the residual valve assembly 12 (for example, when the cylinder pressure and the regulator pressure are in equilibrium, such as when a user is not breathing from the regulator assembly), the spring 18 is uncompressed and urges the residual valve assembly 12 into the closed position.

In embodiments where the pressure vessel stores breathing oxygen, when a user breathes from the regulator assembly 14, the regulator pressure drops at regulator seat 34 and a pressure differential is generated across the residual valve assembly 12. If the cylinder pressure is greater than the tensile force of the spring 18 (greater than the residual level), the cylinder pressure causes the spring 18 to compress and in turn raise the poppet valve 16 out of the seat 32 of the tube 30 so the residual valve assembly 12 is in the open position (FIG. 3). Once a user stops breathing from the regulator assembly 14, there is no longer a pressure differential across the residual valve assembly 12 and the spring 18 uncompresses, which in turns moves poppet valve 16 into its closed position (FIG. 2) and forms a seal within seat 32 of the tube 30.

If the cylinder pressure drops below the residual level and a user breathes into the regulator assembly 14, the cylinder pressure will not be sufficient to overcome the force of the spring 18 and the poppet valve 16 will remain in its closed position. In this way, a residual pressure will remain within the pressure vessel 10. By maintaining a residual pressure in the pressure vessel 10, contaminants or gaseous diluents are prevented from entering the pressure vessel.

In some embodiments, the regulator assembly 14 includes various ports, such as but not limited burst disc port 36 and fill port 38 (FIGS. 2-3), that are positioned within the regulator assembly 14 so that incoming gas (or other suitable liquid) can flow around the residual valve assembly 12 when desired. As such, when the pressure vessel 10 is being pressurized (charged), incoming oxygen (or other suitable gas or liquid) can flow around the valve body 22 and into the pressure vessel 10 by way of the ports 36 and/or 38 without being impeded by the residual valve assembly 12. The burst disc port 36 and/or the fill port 38 may be positioned in any suitable location and are not limited to the configuration shown in the Figures.

FIGS. 4-8 show another embodiment of a residual valve assembly 112 situated within a housing 128 of a regulator assembly 114 that is connected to a pressure vessel 110. The residual valve assembly 112 operates in a similar manner as the residual valve assembly 12 described above, except the residual valve assembly 112 is situated within the regulator assembly 114 so that atmospheric pressure acts on one end 117 of the residual valve assembly 112 while cylinder pressure acts on the other end 115 (see FIG. 5).

In operation, the gas (or other contents of the pressure vessel 110) leaves the cylinder and enters the regulator assembly 114 through tube 130, which is in communication with the pressure vessel contents. In one non-limiting embodiment, the gas (or other contents) passes through a filter 142 and into a lower spacer 144 of the regulator assembly 114. In this non-limiting embodiment, the gas (or other contents) exits the lower spacer 144 through one or more openings 123 and moves into the outer wall 125 of the valve body 122. The gas then flows upwardly and enters one or more passageways 140. While in the one or more passageways 140, the flow of the gas (or other contents), which is sometimes referred to as the cylinder pressure, impinges on the proximal end 115 of the poppet 116.

Figure 5:
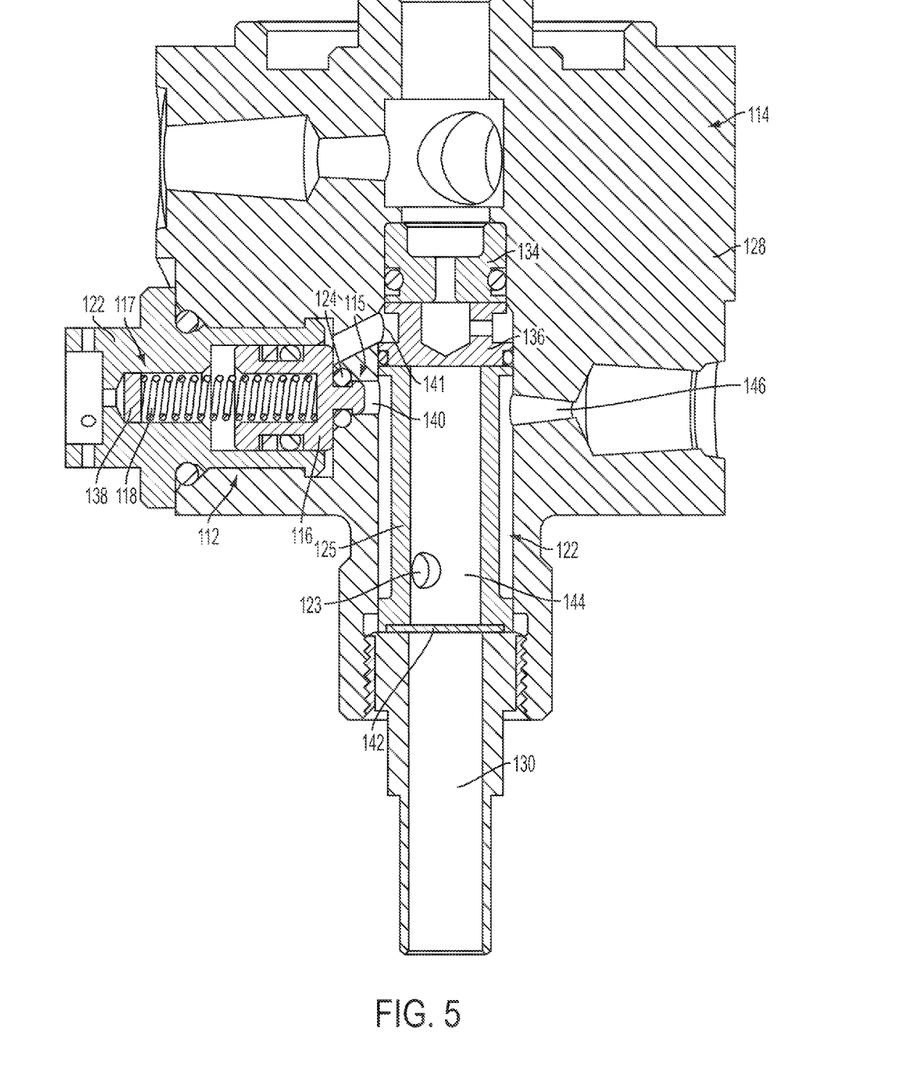
FIG. 5 is a side cross-sectional view of a portion of the regulator assembly of FIG. 4, shown with the residual pressure valve in the closed position.
Figure 6:
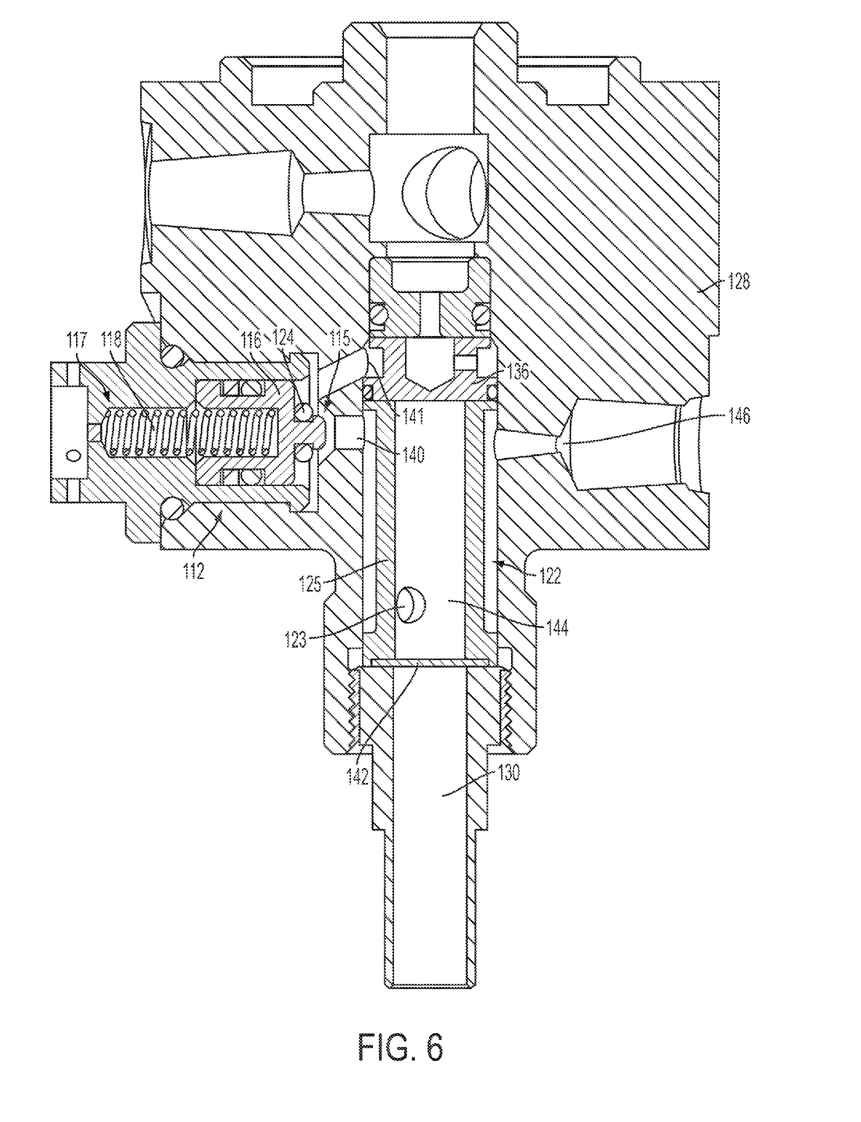
FIG. 6 is a side cross-sectional view of the portion of the regulator assembly of FIG. 5, shown with the residual pressure valve in the open position.

When the cylinder pressure acting on the end 115 is greater than the atmospheric pressure acting on the end 117 and/or the tensile force of the spring 118, the cylinder pressure compresses the spring 118 and moves the poppet 116 into the open position (FIG. 6). When in the open position, the gas (or other contents) is permitted to flow through the one or more passageways 140 to one or more passageways 141. As shown in FIGS. 5-8, the one or more passageways 141 are in communication with an upper spacer 136 and, as such, the gas (or other contents) then flows from the one or more passageways 141 into the upper spacer 136 and up through the regulator seat 134.

If the cylinder pressure drops below the atmospheric pressure and the tensile force of the spring, the spring 118 move back to its uncompressed state, moving the residual valve assembly 112 to the closed position (FIG. 5). When in the closed position, the poppet valve 116 seals the passageway 140 so that the gas (or other contents) is prevented from flowing to the passageways 141 and thus cannot flow to the upper spacer 136 of the regulator assembly 114. In some embodiments, one or more O-rings 124 extends around the poppet valve 116 to further seal the passageway 140 from the passageways 141 when the residual valve assembly 112 is in the closed position.

When the cylinder pressure acting on the proximal end 115 of the residual valve assembly 112 is greater than the ambient pressure acting on the distal end 117 of the residual valve assembly 112, the cylinder pressure compresses the spring 118, which urges the poppet valve 116 into the open position. The poppet valve 116 is held in the open position until the ambient pressure on the distal end of the residual valve assembly 112 and the tensile force of the spring 118 overcomes the cylinder pressure acting on the end 115 of the residual valve assembly 112, at which point the spring decompresses and the poppet valve 116 moves to the closed position and forms a tight seal between the poppet valve and the one or more passageways 140. In other words, once the contents of the pressure vessel drops below a certain, predetermined level and therefore the cylinder pressure drops below a certain, pre-determined level (sometimes referred to as the residual level), the atmospheric pressure and the tensile force of the spring move the residual valve assembly 112 into the closed position, thus preventing the gas or other contents from moving into the regulator seat 136. In this way, the residual valve assembly 112 ensures that a residual amount of gas or other contents remain within the pressure vessel 110, helping prevent contaminants or gaseous diluents from entering the pressure vessel. In some embodiments, the tensile force of the spring 118 is selected so that the combination of the atmospheric pressure and the tensile force of the spring 118 is generally less than the cylinder pressure until the cylinder pressure reaches (or drops below) the residual level, ensuring that the residual valve assembly 112 moves to the closed position when the cylinder pressure drops below the residual level. In other words, the tensile force of the spring may be generally proportional to the residual level.

In some embodiments, another filter 138 (FIG. 5) is located between the internal cavity of the residual valve assembly 112 and the exterior of the residual valve assembly 112 to prevent exterior containments from entering the residual valve assembly 112 while still allowing the ambient pressure to act on the distal end 117 of the residual valve assembly 112. Because both atmospheric pressure and cylinder pressure act on opposing ends of the residual valve assembly 112, a differential pressure is always present across the residual valve assembly 112, biasing the poppet valve 116 into the open position until the cylinder pressure associated with the contents of the pressure vessel drops below the residual level.

Like the regulator assembly 14, regulator assembly 114 includes various ports, not all of which are illustrated. For example, regulator assembly 114 may include a fill port 146 that is positioned within the regulator assembly 114 so that incoming gas (or other suitable liquid) can flow around the residual valve assembly 112 when desired. As such, when the pressure vessel 110 is being pressurized (charged), incoming oxygen (or other suitable gas or liquid) can flow into the pressure vessel 110 by way of the port 146 without being impeded by the residual valve assembly 112. The fill port 146 may be positioned in any suitable location and is not limited to the configuration shown in the Figures.

Figure 7:
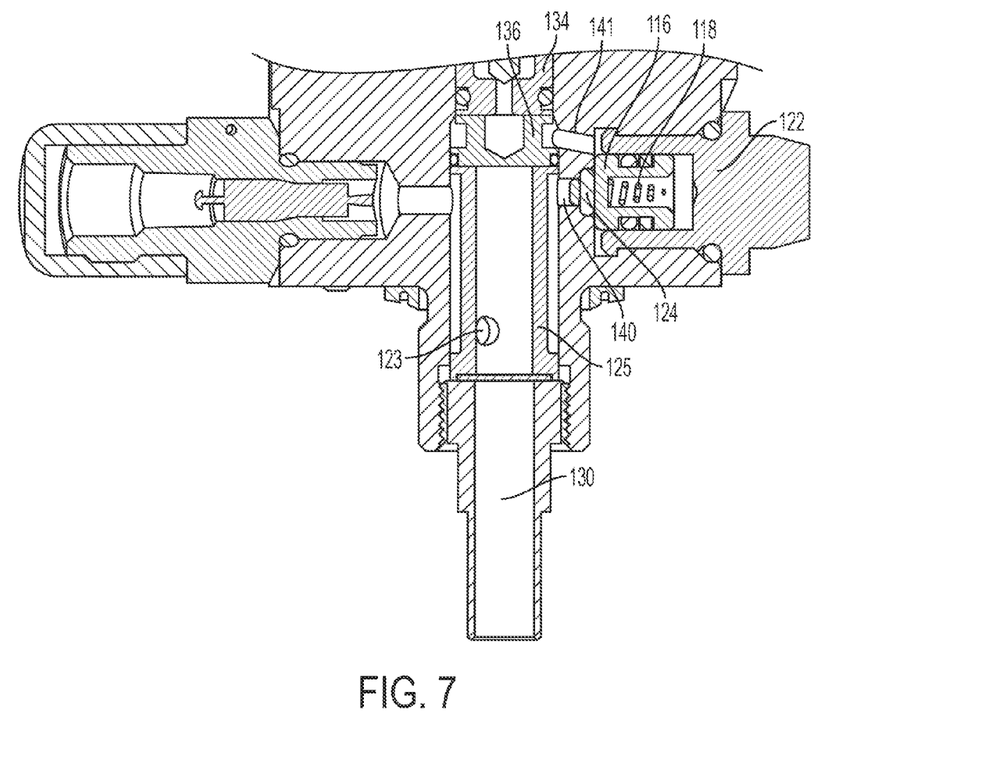
FIG. 7 is another side cross-sectional view of a portion of the regulator assembly of FIG. 4.

Although as illustrated in FIGS. 5-7, the passageways 141 are located above and offset from the passageway 140, any suitable configuration and/or orientation may be used. Other modifications are envisioned, for example the use of more or less passageways/conduits or other arrangements for sealing the pressure vessel from the upper seat of the regulator assembly when the pressure within the pressure vessel drops below a predetermined, residual pressure level.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

We claim:

1. A pressure vessel assembly comprising:
    a regulator assembly comprising a housing and a regulator seat;
    a pressure vessel coupled with the regulator assembly via a fluid path, the fluid path having an inlet proximate the pressure vessel and an outlet proximate the regulator assembly;
    a residual valve assembly comprising a poppet valve and a spring, wherein the residual valve assembly moves between a closed position and an open position;
    a regulator seat passageway that forms at least a portion of the fluid path between the pressure vessel and the regulator assembly, wherein the regulator seat passageway is not coaxial with either the inlet or the outlet;
    wherein, when the residual valve assembly is in the open position, a fluid is permitted to flow from the pressure vessel to the regulator seat via the regulator seat passageway; and
    wherein, when the residual valve assembly is in the closed position, the residual valve assembly prevents the fluid from flowing from the pressure vessel to the regulator seat.

2. The pressure vessel assembly of claim 1, wherein the regulator assembly further comprises a lower spacer located between the regulator seat and the pressure vessel and positioned within an outer wall, the lower spacer comprising at least one opening that opens into the outer wall.

3. The pressure vessel assembly of claim 2, wherein:
    when the residual valve assembly is in the closed position, the fluid is permitted to flow between the pressure vessel and the lower spacer and the outer wall, but the residual valve assembly prevents the fluid from flowing into the regulator seat via the regulator seat passageway; and
    when the residual valve assembly is in the open position, the fluid is permitted to flow between the pressure vessel and the lower spacer and the outer wall and is also permitted to flow to the regulator seat via the regulator seat passageway.

4. The pressure vessel assembly of claim 2, wherein the regulator assembly further comprises an upper spacer positioned between the regulator seat and the lower spacer, the upper spacer being in fluid communication with the regulator seat.

5. The pressure vessel assembly of claim 1, wherein, when the residual valve assembly is in the open position, the fluid flows along the fluid path between the regulator seat and the pressure vessel without passing through the spring or a length of the poppet valve.

6. The pressure vessel assembly of claim 1, wherein the regulator seat passageway is not in fluid communication with the spring or a length of the poppet valve.

7. The pressure vessel assembly of claim 1, wherein the spring and a length of the poppet valve are not in the fluid path.

8. The pressure vessel assembly of claim 1, wherein the residual valve assembly remains in the open position during predetermined regular operating parameters and moves to the closed position upon a triggering event, and wherein the triggering event is cylinder pressure acting on the residual valve assembly from the pressure vessel dropping below a residual level and wherein movement of the residual valve assembly to the closed position upon the triggering event maintains a minimum pressure level inside the pressure vessel.

9. The pressure valve assembly of claim 1, wherein, when the residual valve assembly moves from its open position to its closed position, a residual amount of pressure remains inside the pressure vessel and the residual valve assembly prevents the fluid from leaving the pressure vessel.

10. A pressure vessel assembly comprising:
a flow control device comprising a housing and a seat;
a pressure vessel coupled with the flow control device via a flow path;
a residual valve assembly comprising a poppet valve and a spring, wherein the residual valve assembly moves between a closed position and an open position;
a flow control device passageway forming at least a portion of the flow path between the pressure vessel and the flow control device;
wherein:
when the residual valve assembly is in the open position, a fluid is permitted to flow between the pressure vessel and the seat of the flow control device via the flow control device passageway without passing through the spring or a length of the poppet valve; and
when the residual valve assembly is in the closed position, the residual valve assembly prevents the fluid from flowing between the pressure vessel and the seat; and
when the residual valve assembly is in the closed position, a residual amount of pressure remains inside the pressure vessel and the residual valve assembly prevents the fluid from leaving the pressure vessel.

11. The pressure vessel assembly of claim 10, wherein the flow control device passageway is not coaxial with an inlet of the flow path that is proximate the pressure vessel and is not coaxial with an outlet of the flow path that is proximate the flow control device.

12. The pressure vessel assembly of claim 11, wherein the flow control device further comprises a lower spacer located between the seat and the pressure vessel and positioned within an outer wall, the lower spacer comprising at least one opening that opens into the outer wall.

13. The pressure vessel assembly of claim 12, wherein:
when the residual valve assembly is in the closed position, the fluid is permitted to flow between the pressure vessel and the lower spacer and the outer wall, but the residual valve assembly prevents the fluid from flowing into the flow control device passageway; and
when the residual valve assembly is in the open position, the fluid is permitted to flow between the pressure vessel and the lower spacer and the outer wall and is also permitted to flow to the flow control device passageway.

14. The pressure vessel assembly of claim 12, wherein the flow control device assembly further comprises an upper spacer positioned between the seat and the lower spacer, the upper spacer being in fluid communication with the seat.

15. The pressure vessel assembly of claim 10, wherein the residual valve remains in the open position during predetermined regular operating parameters and moves to the closed position upon a triggering event, and
wherein the triggering event is cylinder pressure acting on the residual valve assembly from the pressure vessel dropping below a residual level.

16. The pressure vessel assembly of claim 10, wherein the flow control device is a regulator assembly.

17. A pressure vessel assembly comprising:
a flow control device comprising a housing and a seat;
a pressure vessel coupled with the flow control device via a flow path;
a residual valve assembly comprising a poppet valve and a spring, wherein the residual valve assembly moves between a closed position and an open position;
wherein:
when the residual valve assembly is in the open position, a fluid is permitted to flow between the pressure vessel and the seat of the flow control device;
when the residual valve assembly is in the closed position, the residual valve assembly prevents the fluid from flowing between the pressure vessel and the seat of the flow control device; and
when the residual valve assembly is in the closed position, a residual amount of pressure remains inside the pressure vessel and the residual valve assembly prevents the fluid from leaving the pressure vessel.

18. The pressure vessel assembly of claim 17, wherein the poppet valve and the spring are outside the flow path.

19. The pressure vessel assembly of claim 17, wherein the flow control device further comprises a lower spacer located between the seat and the pressure vessel and positioned within an outer wall, the lower spacer comprising at least one opening that opens into the outer wall.

20. The pressure vessel assembly of claim 19, wherein:
when the residual valve assembly is in the closed position, the fluid is permitted to flow between the pressure vessel and the lower spacer and the outer wall, but the residual valve assembly prevents the fluid from flowing from the pressure vessel to the seat; and
when the residual valve assembly is in the open position, the fluid is permitted to flow between the pressure vessel and the lower spacer and the outer wall and is also permitted to flow through into the seat.

21. The pressure vessel assembly of claim 19, wherein the flow control device further comprises an upper spacer positioned between the seat and the lower spacer, the upper spacer being in fluid communication with the seat.

22. The pressure vessel assembly of claim 17, wherein the residual valve assembly remains in the open position during predetermined regular operating parameters and moves to the closed position upon a triggering event, and
wherein the triggering event is cylinder pressure acting on the residual valve assembly from the pressure vessel dropping below a residual level.

23. The pressure vessel assembly of claim 17, wherein, when the residual valve assembly is in the open position, the fluid is permitted to flow between the pressure vessel and the seat without passing through a length of the poppet valve and without passing through the spring.

24. The pressure vessel assembly of claim 17, wherein the flow control device is a regulator assembly.

* * * * *